(12) United States Patent
Honda

(10) Patent No.: US 6,450,766 B1
(45) Date of Patent: Sep. 17, 2002

(54) STATOR VANE BLANK AND METHOD OF FORMING THE VANE BLANK

(75) Inventor: Keith T. Honda, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/629,305

(22) Filed: Jul. 31, 2000

Related U.S. Application Data

(60) Provisional application No. 60/147,978, filed on Aug. 9, 1999.

(51) Int. Cl.⁷ .............................................. F04D 29/44
(52) U.S. Cl. ..................... 415/191; 415/209.3
(58) Field of Search .................. 415/191, 208.2, 415/209.3, 209.2; 29/889.21, 34 R

(56) References Cited

U.S. PATENT DOCUMENTS 5,083,900 A * 1/1992 Carletti et al. .............. 415/191

* cited by examiner

Primary Examiner—Edward K. Look
Assistant Examiner—James M McAleenan
(74) Attorney, Agent, or Firm—Gene D. Fleischhauer

(57) ABSTRACT

STATOR VANE BLANK AND METHOD OF FORMING THE VANE BLANK A forged vane blank for forming a stator vane for a rotary machine is disclosed. Various construction details are developed which facilitate forging and machining of the vane blank into its final form as a stator vane. In one detailed embodiment, the vane blank has a greater draft angle at the outer surface than the draft angle at the inner surface as a result of the forging operation.

10 Claims, 5 Drawing Sheets

STATOR VANE BLANK AND METHOD OF FORMING THE VANE BLANK

This application claims benefit from U.S. Provisional Application Ser. No. 60/147,978 filed on Aug. 9, 1999.

TECHNICAL FIELD

This invention relates to a stator structure of the type used in rotary machines, and more specifically, to structure within the compression section to guide working medium gases through the section.

BACKGROUND OF THE INVENTION

An axial flow rotary machine, such as a gas turbine engine for an aircraft, has a compression section, a combustion section, and a turbine section. An annular flow path for working medium gases extends axially through the sections of the engine. The gases are compressed in the compression section to raise their temperature and pressure. Fuel is burned with the working medium gases in the combustion section to further increase the temperature of the hot, pressurized gases. The hot, working medium gases are expanded through the turbine section to produce thrust and to extract energy as rotational work from the gases. The rotational work is transferred to the compression section to raise the pressure of the incoming gases.

The compression section and turbine section have a rotor which extends axially through the engine. The rotor is disposed about an axis of rotation Ar. The rotor includes arrays of rotor blades which transfer rotational work between the rotor and the hot working medium gases. Each rotor blade has an airfoil for this purpose which extends outwardly across the working medium flow path. The working medium gases are directed through the airfoils. The airfoils in the turbine section receive energy from the working medium gases and drive the rotor at high speeds about an axis of rotation. The airfoils in the compression section transfer this energy to the working medium gases to compress the gases as the airfoils are driven about the axis of rotation by the rotor.

The engine includes a stator disposed about the rotor. The stator has an outer case and arrays of stator vanes which extend inwardly across the working medium flowpath. The stator extends circumferentially about the working medium flow path to bound the flow path. The stator includes an outer flowpath wall (outer case) and seal elements supported from the wall for this purpose. An example is an inner shroud assembly having a circumferentially extending seal member (rubstrip). The rubstrip is disposed radially about rotating structure and may be supported, for example, by the vanes through an inner shroud. The rubstrip is in close proximity to associated knife-edge seal elements which extend circumferentially on the rotor and together form a seal that blocks the leakage of working medium gases from the flowpath.

The stator vanes and the rotor blades are designed to receive, interact with and discharge the working medium gases as the gases are flowed through the engine. The arrays of stator vanes are disposed upstream of the arrays of rotor blades in both the compression section and turbine section. The stator vanes each have an airfoil located in a predetermined manner with respect to the adjacent stator vanes for guiding the working medium gases to the rotor blades. The airfoils in the forward portion of the compression section are frequently struck by foreign objects that flow into the engine with the incoming stream of gases. These may include large foreign objects such as wild fowl or chunks of ice that may break away from adjacent structure under operative conditions. The stator vane immediately downstream of the fan blade must tolerate these impacts without tearing loose from adjacent structure and moving rearwardly into the adjacent stage of rotating rotor blades. In addition, the stator vanes are frequently replaced over the life of the engine. The replacement vanes are preferably located in a repeatable fashion such that the aerodynamic characteristics of the array of compressor vanes are maintained. Finally, seal elements such as rubstrips formed of silicone rubber which are supported by the stator vanes must tolerate severe rubs from rotating structure. Such rubs may occur during normal operative conditions of the engine or during abnormal operative conditions that might occur, for example, after an impact by a foreign object against the engine. The rubstrip must tolerate the severe rub without delaminating (a non-cohesive failure) and moving into the flow path and the stator vane must have a large enough base to support the airfoil and seal against such rubs.

Another concern is the manufacture of the stator vane from a vane blank. The present designs of the stator vane blank, as shown in the prior art drawings 3A–3C, results in forming a rather large pedestal on the inner surface of the base of the vane. The mass of the pedestal both contributes to engine weight and to possible disruption of the engine flowpath. Nevertheless, the mass of material on the forged head of the vane blank is required for both the forging operation and, in some cases, for the machining operation.

The above notwithstanding, scientists and engineers working under the direction of Applicants Assignee have sought to develop stator assemblies having arrays of stator vanes that are locatable in repeatable fashion after replacement and have acceptable levels of durability and replaceability.

SUMMARY OF INVENTION

According to the present invention, a stator vane blank for forming a stator vane for a rotary machine has a forged head having a pair of angled surfaces which form the outer surface that are at a greater angle than the angle between the pair of angled surfaces which form the inner surface that faces toward the airfoil.

In accordance with the present invention, the outer surface has an included angle alpha at the outer surface which is about nine degrees and an included angle beta at the inner surface which is about three degrees or less. In one embodiment, the angled surface has an included angle beta that is about one and one-half (1½) degrees A primary feature the present invention is the included angle alpha at the outer surface after the vane blank is forged. Another feature is the included angle beta at the inner surface after the vane blank is forged. Another feature is the mass of material on the outer surface of the vane blank as compared to the smaller mass material on the inner surface of the vane blank where the overall mass of material is a required minimum amount for forging and machining operations. Another feature is the size of the pedestal after the inner surface is machined to form the inner surface of the stator vane by reason of the angle beta being smaller than the angle alpha and thereby creating a smaller pedestal because of the distance from the inner surface to the inner most portion of the head on the vane blank.

A primary advantage of the present invention is the cost of machining a stator vane from a forged vane blank where the stator vane has less material disposed on its inner surface that must be machined away by reason of the included angle beta being smaller than the included angle alpha on the outer surface. Another advantage is the engine efficiency which results from the weight of the engine which weight is reduced by having a smaller pedestal left behind after the inner surface is finally machined by disposing the mass of material that is required for the head during forging and machining operation on the outer surface where the material is machined away in the final machining process.

The foregoing features and advantages of the present invention will become more apparent in light of the following detailed description of the best mode for carrying out the invention and accompanying drawings.

BEST MODE

Figure 1:
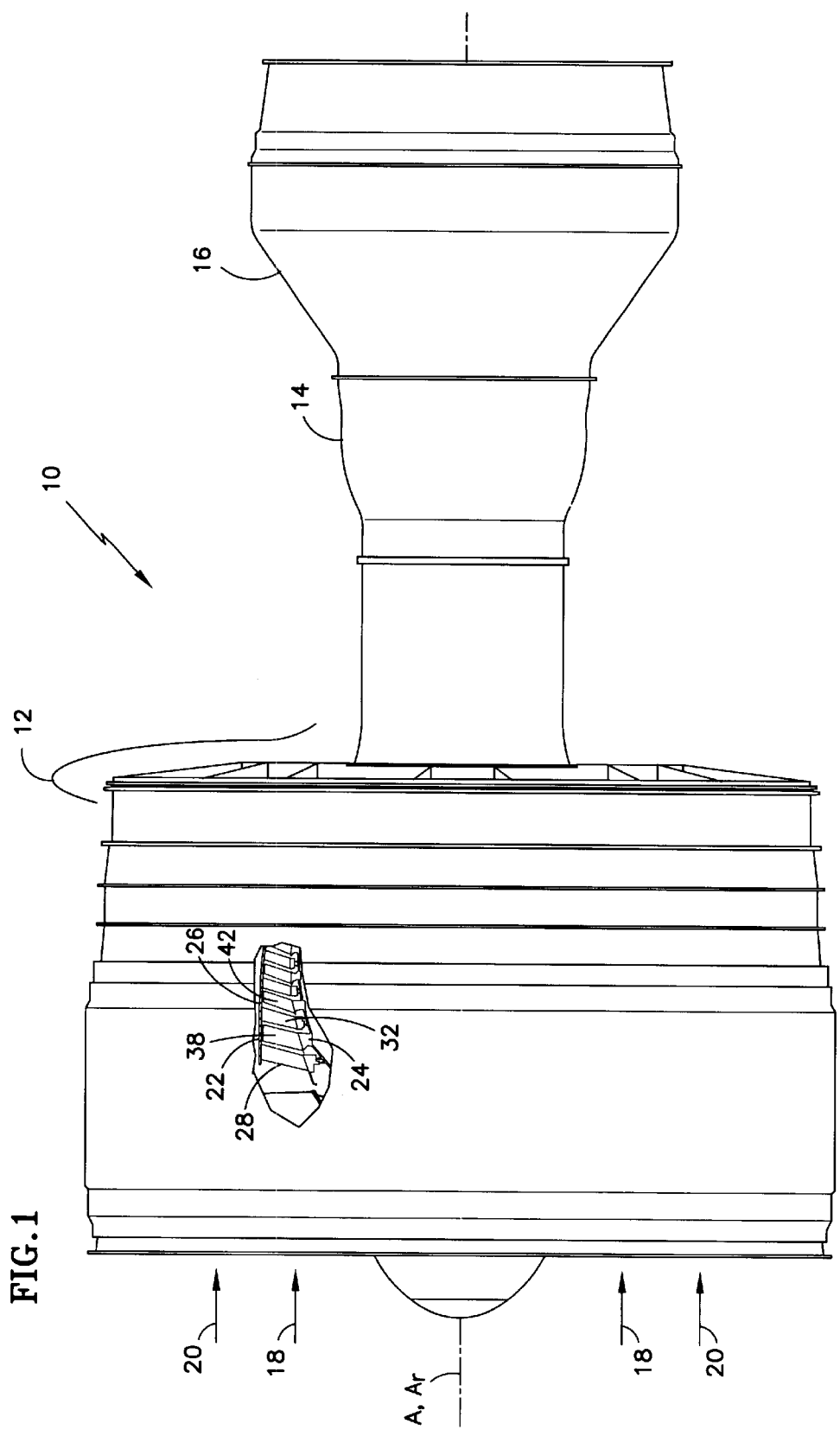
FIG. 1 is a schematic side elevation view of a gas turbine engine with portions of the engine broken away to show the compression section of the engine.

FIG. 1 is a schematic, side elevation view of a rotary machine 10, such as a turbofan gas turbine engine. The engine is disposed about an axis of symmetry A and has an axis of rotation Ar. The engine includes a compression section 12, a combustion section 14, and a turbine section 16. An annular, primary flowpath 18 for working medium gases extends axially through the sections of the engine. A by-pass flowpath 20 is outward of the primary flow path.

The engine is partially broken away to show a stator 22 and a rotor 24 in the compression section 12. The stator 22 includes an outer case 26 (flowpath wall) which extends circumferentially about the primary flowpath. The stator includes arrays of stator vanes, as represented by the stator vane 28 and the stator vane 32 in the compression section. The rotor has arrays of rotor blades, as represented by the rotor blade 38 and the rotor blade 42.

Figure 2:
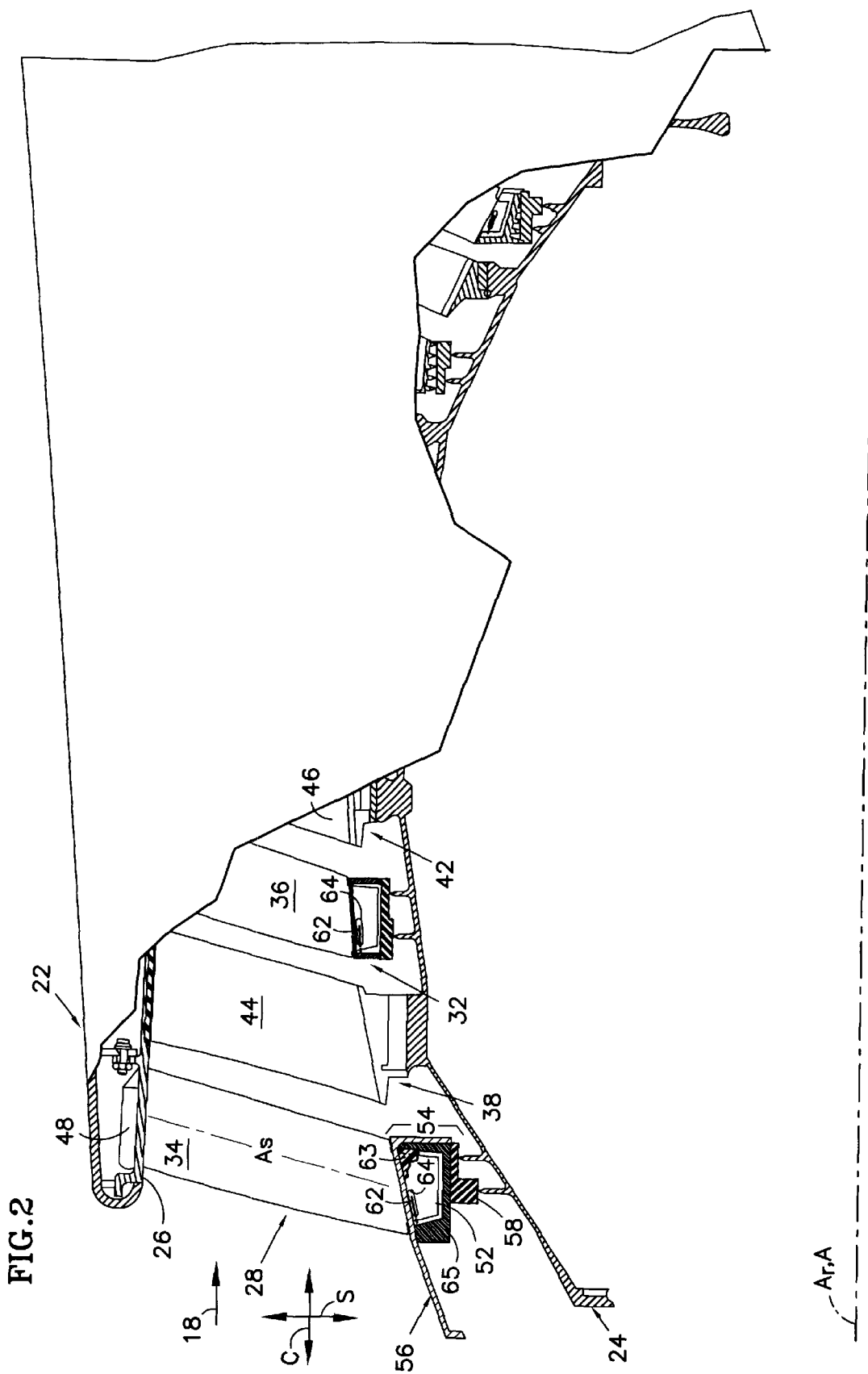
FIG. 2 is a side elevation view of a portion of the compression section shown in FIG. 1

FIG. 2 is an enlarged side elevation view of a portion of the engine shown in FIG. 1 which is partially in section and broken away for clarity. As shown in FIG. 1 and FIG. 2, each stator vane 28, 32 has an airfoil, as represented by the airfoil 34 and the airfoil 36. The airfoils extend inwardly from the outer case to direct the flow of working medium gases as the gases pass through the compression section and the turbine section.

Each rotor blade 38, 42 has an airfoil, as represented by the airfoil 44 and the airfoil 46. The rotor blade airfoils extend radially outwardly across the working medium flow path and into close proximity with the stator 22.

FIG. 2 shows the first array of stator vanes 28 extending radially inwardly from the outer case. Each vane 28 is disposed about a spanwise axis As which extends in a generally radial direction. The vane has a base 48 and a vane tip 52. The vane tip is an extension of the airfoil 34. A plurality of airfoil sections are disposed chordwisely about the spanwise axis As to define the contours of the airfoil (as used herein, plurality means an indefinite number of two or more). The airfoil has a chordwise direction C and a spanwise direction S that provide reference directions. The spanwise direction is generally perpendicular to the axis of rotation Ar.

An inner shroud assembly 54 extends circumferentially about the axis of rotation Ar and outwardly of the rotor. The inner shroud assembly might be circumferentially continuous or circumferentially segmented. The inner shroud assembly includes an inner shroud 56 and a rubstrip 58. The inner shroud is formed of aluminum. In one embodiment, the inner shroud is a circumferentially continuous ring. The rubstrip 58 is formed of an elastomeric material, such as silicone rubber.

The tip 52 of the stator vane 28 extends radially through the inner shroud 56. A clip member 62 of titanium extends circumferentially through an opening 64 in the stator vane tip 52. The clip member and tip are disposed in a potting member 63 formed of a second elastomeric material. The potting member encapsulates the tip and the clip member. The second elastomeric material might be disposed locally at each vane or extend circumferentially as a circumferentially continuous band. A bottom layer 65 of a third elastomeric material extends circumferentially to support the rubstrip.

Figure 3:
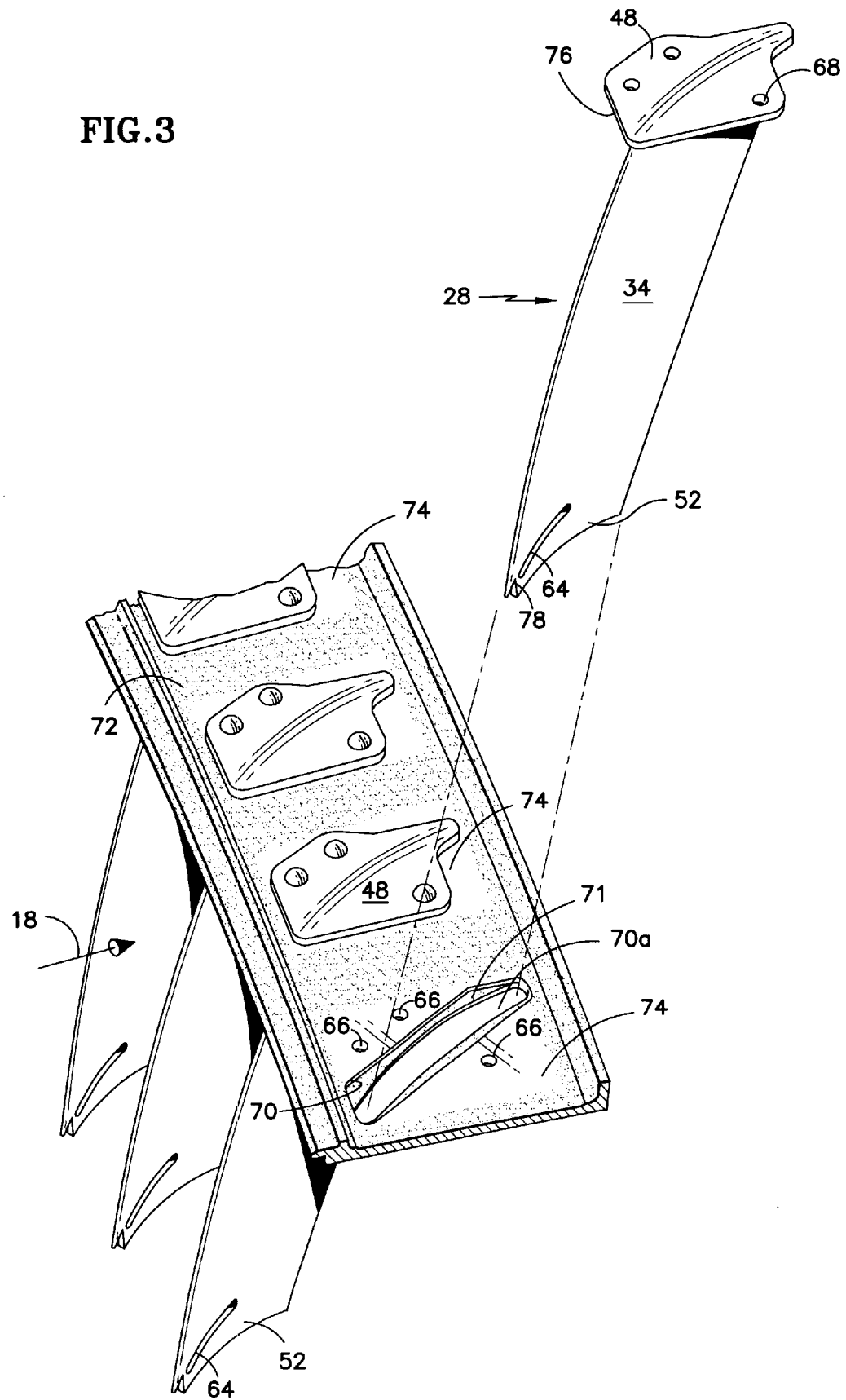
FIG. 3 is a perspective view of a stator vane from the gas turbine engine shown in FIG. 1.

FIG. 3 is a partial perspective view of the array of stator vanes 28 shown in FIG. 2. As can be seen, the outer case has a plurality of openings 66 for fasteners, as represented by the three rivet holes.

The base 48 of the stator vane 28 has three corresponding rivet holes 68, each for receiving an associated rivet formed of a copper nickel composition such as Monel material. The rivets are solid rivets and compressed and expanded to completely fill the hole and to provide a tight fit for urging the base of the vane 28 into engagement with the outer case.

The outer case has a plurality of circumferentially spaced openings, as represented by the openings 70, 70a. The opening 70 is partially countersunk or counterbored leaving a shelf 71 bounding the opening. The outer case has an outwardly facing, non-flowpath surface 72 which extends circumferentially and which presses against the base of the vane 28. One satisfactory material for the outer case is aluminum. The outwardly facing surface has a plurality of flats 74 or planar surfaces machined into the outer surface which are disposed adjacent to the opening 70. The surfaces may be circumferentially spaced or touch at a boundary. The term "flat" means plane-like within reasonable manufacturing tolerances and not curved.

The vane 28 has an inwardly facing surface 76 which mates with the outer surface on the case. The inwardly facing surface 76 on the base of the vane 28 is planar and lies in a plane at the bearing surface. The plane on the base is parallel to the plane 74 of the finished surface area. In alternate embodiments, the finished surface on the outer case might consist of two flats lying in the same plane, two flats which are angled to each other or which are parallel to each other but lie in slightly radially spaced planes. The simplest approach is to provide a single plane surface 74 or flat for the finished surface area at each of the locations on the outer case and a mating plane surface for those areas of the stator vane 28 which bears against the plane surface. The single plane surface has many advantages such as simplicity of manufacture, inspectability and ability to engage the stator vane 28.

The stator vane 28 extends radially inwardly into and across the working medium flowpath 18. The slot 64 or opening in the airfoil 46 adapts the airfoil to receive the clip member 62. The opening extends nearly to an edge of the airfoil but is spaced from the edge leaving a support strip 78 of relatively narrow material which bounds the opening.

Figure 3A:
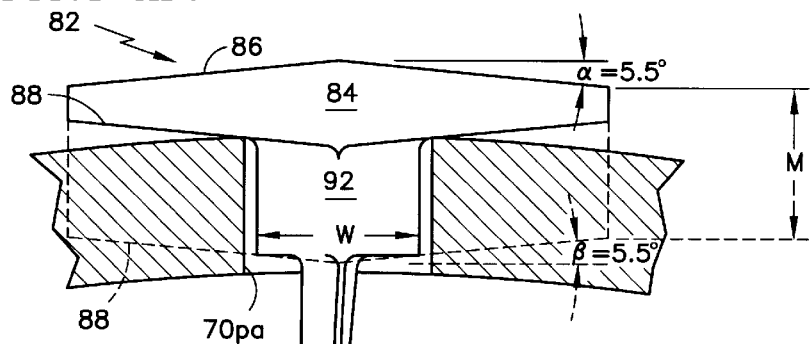
FIGS. 3A–3C are schematic representations of the method for forming the base of the stator vane shown in FIG. 2 in the prior art.

FIG. 3A shows with dotted lines a vane blank 82 fabricated as forged in the prior art. Reference numbers for the prior art construction refer to the same elements shown for the present invention, but are followed by the designation "pa". Thus, the base of the prior art construction is referred to as "48pa". The vane blank has a head 84 or precursor of the base 48pa shown in FIG. 3C. The head has an outer or outwardly facing side 86 and an inner or inwardly facing side 88. The head is shown in full with material of the head removed for comparison purposes with the present invention. As shown in full, the inner surface is parallel to the inner side 88 of the vane in the as-forged condition. The head is shown with material removed until the edge has reached the finished radial dimension.

The head 84 has a draft angle or drawing angle alpha on the outwardly facing side 86, and a draft angle beta on the inwardly facing side 88. The total included angle (summation of alpha and beta) is set for forging purposes and is eleven (11) degrees. The angles of the two surfaces shown are equal to each other and to five and one half (5½) degrees. The head 84 for the base 48pa is formed with a required minimum height Min FIG 3 (measured between the inner and outer surface) and with these angles so that the forging can be machined and can interact in the appropriate way with the die in which the forging is formed, such as releasing from the die. The head and, after machining, the base 48pa of the finished vane 28pa have a pedestal 92 which fills the opening formed in the outer case which does not have a shelf.

Figure 3B:
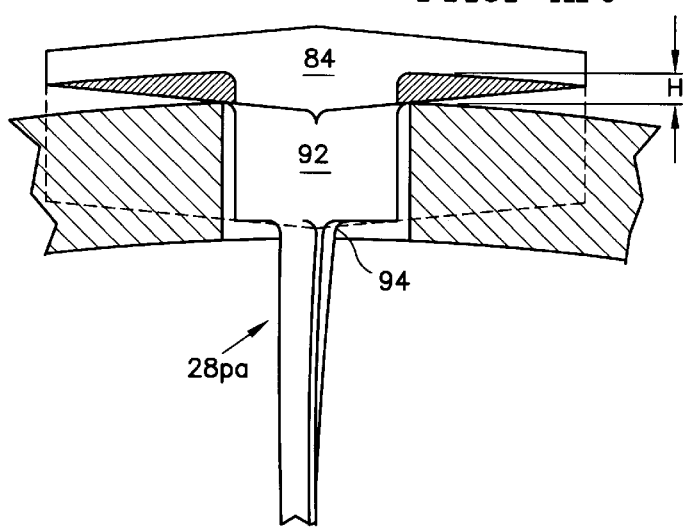

FIG. 3B shows the extent H of the material which machining will remove on the inner side for the vane blank 82 to fit the cylindrical surface of the case. The surfaces on the vane 28pa after machining are flat or curved, and are angled inwardly to press against the cylindrical surface of the outer case. The engagement is along a line of contact L. Accordingly, an advantage of the present invention is the stable engagement between the flat 74 on the planar base and the surface of the outer case, now a flat 74, for locating and suporting the stator vane by having a contact in a plane rather than a line contact as shown in the prior art.

Figure 3C:
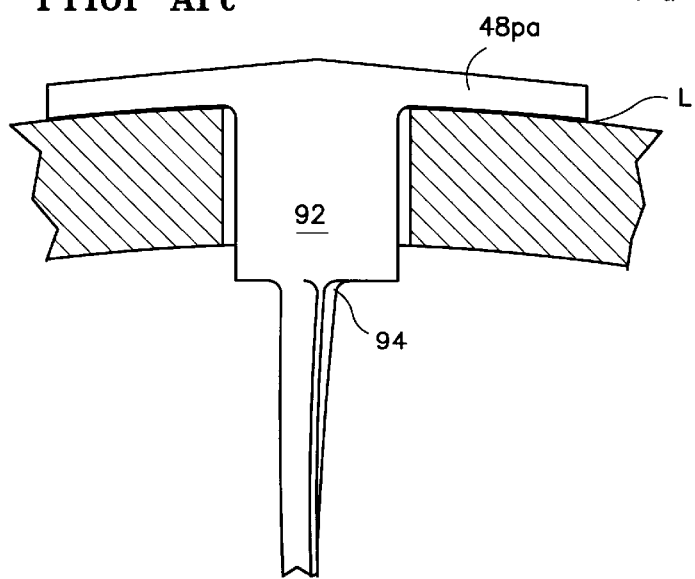

FIG. 3C shows the line contact L of the flat surface of the machined stator vane engaging the arcuate case. The rather large pedestal 92 extends radially through the case 28pa and has a large fillet 94 with a radius which now projects into the working medium flowpath 18. This fillet may cause flow disturbances. In addition, the pedestal is rather large (heavier) in comparison to the vane blank 96 which has a smaller pedestal 98 as shown in FIG. 4A.

Figure 4A:
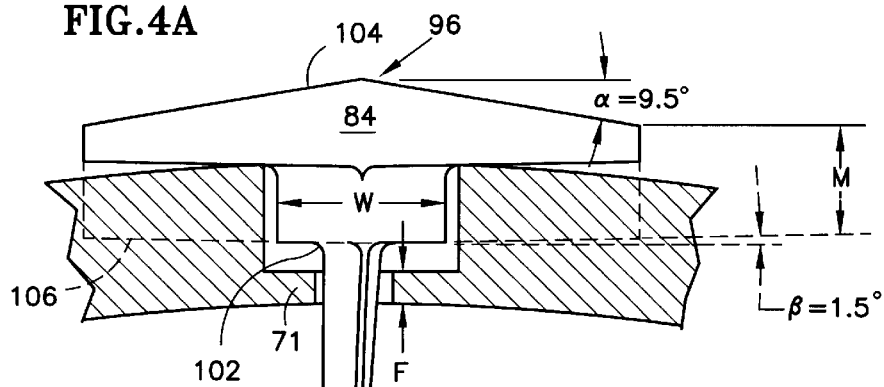
FIGS. 4A–4C are schematic representations of the method of forming the base of the stator vane and a cooperating flat planar surface on the outer case.

FIG. 4A is an illustration of the present vane blank 96 as forged during the forging process. The vertical height M is smaller than the vertical height M shown in FIG. 3A for purposes of explanation. Even with the same height M, the FIG. 4A construction will have the advantages discussed herein although the height of the shelf F will be slightly reduced.

The forging is provided with a draft or draw angle of eleven (11) degrees. Accordingly, the included angle is the same as the eleven degrees shown in FIG. 3A. The angle beta on the inwardly facing surface 106 is smaller than the angle alpha on the outwardly facing side 104. The angle beta may be as little as three (3) degrees or as in the embodiment shown one and a half (1½) degrees. The angle alpha of the outwardly facing surface is nine and a half (9½) degrees. As a result, less material is removed at the inner surface from the head and the pedestal 98 is smaller.

Figure 4B:
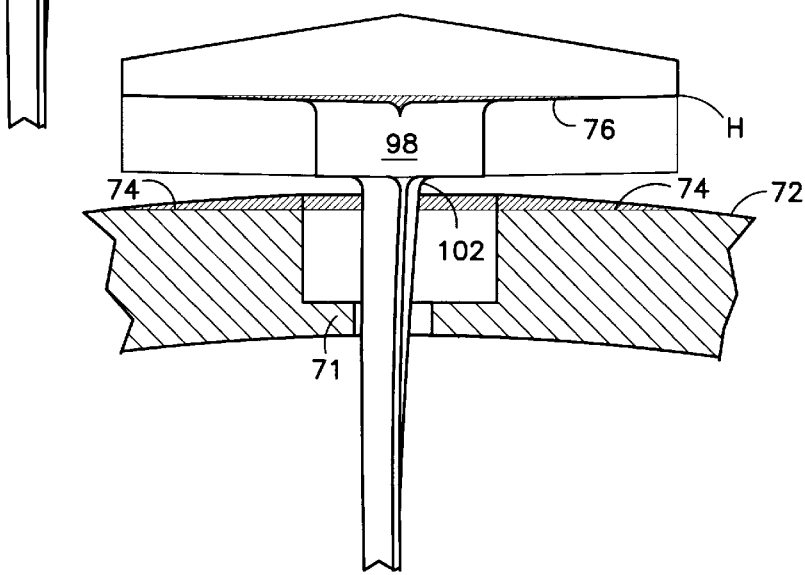
Figure 4C:
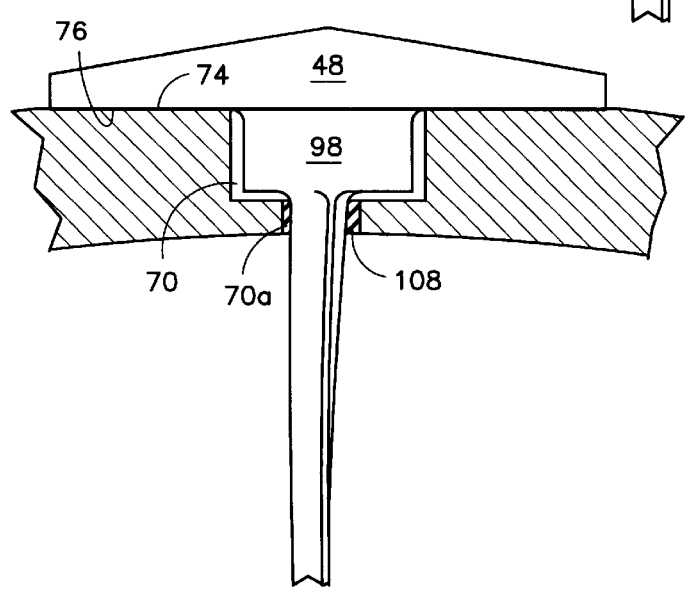

As shown in FIG. 4B the extent H of material for machining on the vane blank 96 is smaller on the inner side. It is also machined to a simple single flat 74 as previously discussed. The area machined on the case is also shown and it is flat (planar) turning the case from a cylindrical surface to one that has a plurality of flats 74 disposed circumferentially about the exterior of the case. In the embodiment shown, these flats are circumferentially spaced. Machining a single flat at each opening, whether the flats are spaced or contiguous, results in less machining and a better, more stable interaction between the inwardly facing surface 76 of the base 48 of the vane 28 and the outwardly facing surface 74 of the outer case. In addition, the circumferentially facing outer case is counter bored with the first opening 70 receiving the reduced volume pedestal. The pedestal 98 and its fillet radius 102 are located outwardly of the shelf 71 and are thus disposed on the interior of the case and do not project out into the working medium flowpath 18. An elastomeric material 108, such as silicone rubber or another suitable rubber, is disposed in the second opening 70a through which the airfoil extends into the working medium flowpath during assembly and under operative conditions.

Accordingly, a method of making the construction includes forming a large draft or drawing angle on the forging where the angle alpha of the outwardly facing surface is greater than the angle beta of the inwardly facing surface measured with respect to a line that is generally perpendicular to the span of the airfoil. Steps further include counterboring the circumferentially extending case such that it has a first opening 70 for receiving the pedestal and a second opening 70a for passing the vane 28 into the working medium flowpath. In addition, three rivet holes are formed in the case to retain the stator vane. Because of the flat surface to flat surface contact between the inwardly facing surface of the stator vane and the outwardly facing surface of the case, good contact and alignment of the stator vane 28 with adjacent stator vanes occurs even with only three rivets. Moreover, if a stator vane 28 is replaced, the replacement stator vane has planar contact which is not markedly disturbed by tolerance variations as would a flat surface engaging a cylindrical surface. Instead, the tolerance variations on the surface of the stator vane interact with a flat surface, providing for more stable engagement.

Although the invention has been shown and described with respect to detailed embodiments thereof, it should be understood by those of ordinary skill that various changes in form and in detail thereof may be made without departing from the spirit and scope of the claimed invention.

I claim:

1. A stator vane blank for forming a stator vane which in its finished form has an airfoil, a pedestal from which the airfoil extends, and a base member from which the pedestal extends, the vane blank having an airfoil shaped projection which extends spanwisely, which comprises:

a head which is adapted to be formed into the stator vane base and pedestal, the head having an inner face facing the projection and an outer face, each face directed in opposite radial directions, each face having spanwise facing surfaces, each face being formed of two planar surfaces each angled toward the other such that the outer surface has an included angle alpha and the inner surface has an included angle beta which is less than the angle alpha.

2. The stator vane blank for forming a stator vane of claim 1 wherein the summation of the included angles is about eleven degrees.

3. The stator vane blank for forming a stator vane of claim 2 wherein the summation of the included angles is less than eleven degrees.

4. The stator vane blank for forming a stator vane of claim 2 wherein the ratio of the angle alpha to the angle beta is greater than about three to one.

5. The stator vane blank for forming a stator vane of claim 1 wherein the angle alpha is about nine degrees and the angle beta is about three degrees.

6. The stator vane blank for forming a stator vane of claim 1 wherein the angle alpha is about nine degrees and the angle beta is about one and one-half degrees.

7. A method of forming a vane blank for a stator vane for the compression section of a rotary machine by forging which includes the steps of:

forging an outwardly facing surface on the vane blank having two planar surfaces and forging an inwardly facing surface on vane blank having two planar surfaces each angled toward the other such that the outer surface has an included angle alpha and the inner surface has an included angle beta which is less than the angle alpha;

machining material from the inner surface leaving a pedestal behind and until a flat surface is formed on the inwardly facing surface on the vane blank.

8. The method of forming a vane blank for a stator vane of claim 7 wherein the step of forging creates an angle alpha which is about nine degrees and an angle beta which is about three degrees.

9. The method of forming a vane blank for a stator vane of claim 8 wherein the step of forging creates an angle alpha which is about nine degrees and an angle beta which is less than about three degrees.

10. The method of forming a vane blank for a stator vane of claim 9 wherein the step of forging creates an angle alpha which is about nine degrees and an angle beta which is about one and one-half degrees (1 ½) degrees.

* * * * *